United States Patent [19]

Rubin

[11] Patent Number: 4,774,258

[45] Date of Patent: Sep. 27, 1988

[54] TREATMENT OF URINARY CALCULI

[76] Inventor: Martin Rubin, 3218 Pauline Dr., Chevy Chase, Md. 20015

[21] Appl. No.: 910,530

[22] Filed: May 30, 1978

[51] Int. Cl.⁴ .......................................... A61K 31/195
[52] U.S. Cl. .................................... 514/561; 514/891
[58] Field of Search ................ 424/DIG. 6, 313, 319; 514/561, 891

[56] References Cited

U.S. PATENT DOCUMENTS 3,038,810  6/1962  Akerboom et al. ................. 426/532
3,184,381  5/1965  Ashmead ............................ 424/319

FOREIGN PATENT DOCUMENTS 1132233  10/1968  United Kingdom ................ 424/325

OTHER PUBLICATIONS

C.A., vol. 51, 1957, 13321h.
Masry et al.; vol. 81, (1974) 9730t.
Bizzi et al., C.A., vol. 50, 1956, 7320g.
Jama, May 7, 1955, pp. 43–44, Wolman.
Corradi et al., C.A., vol. 52, 1958, 17525g.
Budny; C.A., vol. 77 (1972), 109418h.

*Primary Examiner*—Allen J. Robinson
*Attorney, Agent, or Firm*—Lawrence I. Field

[57] ABSTRACT

Urinary calculi commonly known as kidney stones are eliminated by the oral administration of triglycine or other suitable chelating agent in amounts appropriate to either the solubilization of preformed urinary calculi and/or to the prevention of the precipitation of alkaline earth compounds in the urinary tract, which comprise an estimated 85% of such calculi.

12 Claims, No Drawings

TREATMENT OF URINARY CALCULI

This invention relates to the elimination of urinary alkaline earth calculi commonly known as kidney stones. More particularly it relates to a procedure in which an orally administered chelating agent effects the solubilizing of previously formed calcium and magnesium salt urinary calculi of the carbonate, phosphate or oxalate stone types and effectively inhibits the formation of such types of stones in the urinary tract.

It is known that suitable aqueous solutions can be introduced into the urinary tract for the purpose of solubilizing urinary calculi. In the past such introduction has been achieved by catheters, e.g. as described in Schmidt et al U.S. Pat. No. 2,785,174 and elsewhere in the literature. The procedure requires the patient to be confined for an extended interval of time, it may be toxic and it is often painful.

Other previous attempts to treat renal calculi have been directed toward decreasing the concentration in the urine of the major calculi forming constituents such as calcium, oxalate, ammonia and phosphate by inhibiting the absorption of these materials from the gastro-intestinal tract or by decreasing their excretion into the urinary system. Other measures which have been advocated include the oral administration of agents such as MgO or other magnesium salts or an organic compound, ethane-1-hydroxy-1,1-diphosphonate which are expected to have a preventative effect in the formation of stones by inhibiting the agglomeration of small crystals of precipitated alkaline earth salts into the larger characteristic renal stones. Still another approach has been the direct introduction of agents into the urinary tract, as noted above. Finally it should be mentioned that the most frequently utilized modality has been the administration of copious quantities of water by mouth. The presumption in such a situation is that the consequent vigorous dilution of the urinary flow will reduce the concentration of the precipitating elements to the point where renal calculi will not be formed. While such a regime may achieve this goal in some circumstances, it is of no value for the purpose of dissolving a concretion which has already formed and lodged in the renal tract. Likewise this process of extreme hydration is difficult to maintain for protracted periods in humans and impossible to achieve in animals.

While not wishing to be bound by any specific theory, it is believed that previous efforts to orally introduce similar agents into a subject afflicted with urinary calculi have been largely unsuccessful because the materials administered orally presumably react with mineral laden fluids in the gastro-intestinal tract and blood plasma before they can reach the urinary tract and hence are no longer available to react with the urinary calculi or the salts from which they are formed.

The principal object of this invention is to provide a treatment for the elimination of renal or urinary calculi by means of a material which can be administered by mouth, absorbed from the gastro-intestinal tract, pass through the body fluids and appear in the urinary tract in a form suitable to dissolve preformed alkaline earth renal calculi or to prevent the precipitation of the alkaline earth salts which comprise an estimated eighty five percent of renal calculi and thereby prevent the formation of new renal calculi.

Initial consideration of biochemistry, pharmacology and physiology would suggest that the object of this invention could not be attained since it would not seem reasonable to expect that a soluble compound potent enough in its calcium and magnesium binding properties to cause dissolution and solution of solid phase calculi of these alkaline earths could move through the calcium and magnesium laden compartments of the gastro-intestinal tract and the body fluids (where they would certainly combine with calcium and magnesium) finally appearing in the urine free of these alkaline earths and in a form capable of bringing the solid calculi present in the urinary tract into solution, whereby they are ultimately eliminated in the urine.

At least the following requirements are essential in any active agent which is to be administered orally to treat urinary calculi. First of all the agent must be compatible with the subject to be treated and must be non-toxic and must not produce side effects which endanger the health and well being of the subject being treated. Second it must be effective when administered in volumes which can be tolerated by the patient. In addition to the above effective compounds useful for the purposes of this invention can be described by certain properties. The binding constants for effective compounds are required to be in the range of log K metal chelate 4–8 at the pH of 7.4. Useful compounds must also be capable of absorption from the gastro-intestinal tract, be inert (in their final effective form) to the normal metabolic modifications carried out by the body and be readily excreted into the renal tract.

The present invention is based on the fact that suitable conditions for the administration of an appropriate agent can be established whereby a dissolving agent for calcium and magnesium can be administered by mouth to attain the objective of this invention.

It has also been found that the problems arising from the presence of calcium, magnesium and other cations which form chelate complexes with nitrolitriacetic acid in the diet can be overcome by converting the chelating agent to a non-toxic ester or a non-toxic water soluble salt of the ester whereby it may be added to the diet to form a prophylactic or therapeutic mixture. In this form the therapeutic agent is unable to combine with the dietary complex forming compounds but is absorbed from the intestine in the ester form. Upon entry into the body the ester bond is cleaved by normal body processes to produce the therapeutically active ingredient, the free nitrilotriacetic acid.

The invention will be better understood from the examples which follow which are intended to illustrate the invention and not to limit the same.

EXAMPLE I

Metallic zinc sheets weighing 20 to 30 mg where implanted in the urinary tract of a group of rats. The usual effect of the implant was to induce the formation of urinary calculi in the animals. The group was divided into two groups. One group was fed the regular rat diet in which the amount of calcium and magnesium amounted to 12 and 2.3 mg/day. The other group was fed the same regular rat diet to which 200 mg of NTA had been added, this amount being sufficient to combine with all of the Ca and Mg in the normal diet and to provide an excess of 150% above that amount each day. At the end of four months the rats in both groups were killed and were examined. In the group fed the normal rat diet, 100% of the rats were found to have stones in their urinary tracts. In the group fed NTA plus the regular rat diet no stones were found in the urinary tract.

EXAMPLE II

The stones recovered in Example I were implanted in the urinary tracts of a new group of rats. The rats were divided into two groups as before and one group was fed the normal rat diet and the other group was fed the same normal rat diet except that 300 mg NTA was included in the daily ration.

At the end of two months all of the animals were killed. The stones which had been implanted in the group fed NTA had disappeared while those in the group not fed NTA were still present.

EXAMPLE III

Kidney stones removed from the animals in Example II were placed in aqueous neutral solutions of NTA (1.5% by weight) and allowed to stand overnight at room temperature (68° F.). On the following morning it was noted that the stones had dissolved during the twelve (12) hours.

EXAMPLE IV

A six year old female dog which had passed a kidney stone was x-rayed and shown to have a bladder full of kidney stones. The fasting dog was fed 1 gram of the disodium salt of NTA daily by mounth. At the end of this treatment the dog was x-rayed again and the x-rays revealed that the kidney stones were no longer present.

In the preceding examples NTA represents the neutral disodium salt of triglycine which is also known as nitrilotriacetic acid (NTA).

It will be recognized by those skilled in the art that the combination of a chelating agent such as NTA with minerals in the diet will be dependent upon the dietary composition. Thus the dosage of NTA required to achieve the object of this invention must be established by calculation. It is additionally evident that the most efficient administration of the agent, especially for application to humans, will be provided when the subject is in the fasting state.

It will be seen from the above that the oral administration of NTA in amounts which provide an excess over that which will combine with the alkaline earth salts ingested in the diet and hence present in the gastrointestinal tract will not only solubilize urinary calculi already present in a subject, but will also effectively inhibit the formation of new calculi.

The following are further examples of the practice of this invention.

EXAMPLE V 50 g of nitrilotriacetic acid and 3 g of p-toluene-sulfonic acid was suspended in 500 ml of ethanol and 500 ml of benzene. The mixture was refluxed for eighteen hours during which time the water formed in the esterification reaction was removed by azeotropic distillation with replacement of the distilled solvents. The solid NTA slowly dissolved to form a homogeneous solution. Upon completion of the reaction the solution was diluted with an additional liter of benzene, extracted three times with an equal volume of five percent sodium bicarbonate solution, washed to neutrality with water and then concentrated to remove the solvents. The residue was a pale yellow mobile oil, the triethyl ester of nitrolotriacetic acid.

20 g of the ester was shaken with an aqueous solution of 30 g of citric acid dissolved in one liter of water. The ester dissolved in the citric acid solution to form the water soluble citrate salt of the triethyl ester of nitrilotriacetic acid. A faint turbidity in this solution was readily removed by filtration through a water wetted filter paper. The filtrate was a sparkling clear aqueous solution of 2% of the triethyl ester of nitrilotriacetic acid citrate salt.

An equal weight of commercial rat chow and aqueous solution of the citrate salt were mixed. Upon standing for eight hours at room temperature the pelleted food had absorbed all of the solution to provide a homogeneous edible mush of food containing 2% of citrate salt based upon weight of the food. This treated food could be used as such for the prophylaxis or treatment of alkaline earth renal calculi or could be readily dried into a granular or pelleted form.

EXAMPLE VI

Alkaline earth renal calculi were produced in rats by the implantation of a 25 mm zinc pellet in the bladder according to well known procedures. After four months of maintenance on a normal diet when examination of control animals demonstrated that all animals had devloped calculi, the group was divided into two parts. One group was maintained on the normal diet as controls. The remaining half of the animals were given the same diet containing 2% of the citrate salt of the triethyl ester of nitriloacetic acid. After two weeks of treatment the control group of animals upon examination showed the continued presence of large renal calculi. The treated group were without evidence of the presence of the stones.

In addition to the citrate salt of the triethyl ester of NTA other esters of NTA and their salts are useful in the practice of this invention including the following:

(a) N-1 hydroxyethyl iminodiacetic acid

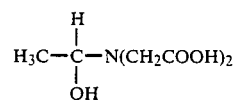

(b) N-2 hydroxyethyl iminodiacetic acid

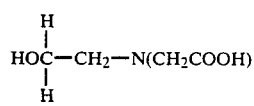

(c) ethylene diamine N-1 and N-2 hydroxyethyl, N,N' triacetic acid.

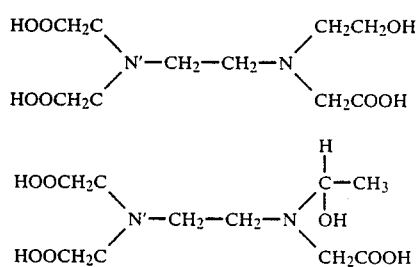

In addition to the examples given in detail in this description the compounds, their esters and their ester salts are effective compounds for the purposes of this invention. Of course the use of only the non-toxic neutral esters and salts of said esters are contemplated in the practice of this invention. Thus the ethyl, n-propyl, ispropyl, and 1,2-propylene glycool esters are effective whereas the methyl ester is not because it is toxic to the host. Similarly as to neutral salts of NTA, the chloride and acetate are not toxic and are acceptable and the sulfate, phosphate, nitrate and oxalate are toxic and are not acceptable.

I claim:

1. The treatment of urinary calculi which consists of the oral administration to a mammal of a treating agent in which the active ingredient is the neutral sodium salt of nitrilotriacetic acid, in an amount sufficient to provide a therapeutic amount in excess of that which is chemically equivalent to the total of calcium and magnesium in the diet of said mammal.

2. A process for treating a mammal afflicated with alkaline earth urinary calculi which consists of administering orally the neutral sodium salt of nitrilotriacetic acid to said mammal in a therapeutic amount in excess of the amount which is equivalent to the intake of Ca and Mg in the diet of said mammal for a time sufficient to dissolve said calculi.

3. The process of claim 2 wherein the mammal is a human being.

4. The process of claim 2 wherein said mammal is on a fasting diet.

5. A process for the prevention of the formation of urinary calculi in mammals which consists of administering orally the neutral sodium salt of nitrilotriacetic acid to said mammal in a therapeutic amount in excess of the amount which is equivalent to the intake of Ca and Mg in the diet of said mammal thereby inhibiting the formation of urinary calculi in the urinary tract of said mammal.

6. The process of claim 5 wherein said mammal is on a fasting diet.

* * * * *